United States Patent
Endo et al.

(10) Patent No.: US 6,927,711 B2
(45) Date of Patent: Aug. 9, 2005

(54) SENSOR APPARATUS

(75) Inventors: Noboru Endo, Okazaki (JP); Takao Tsuruhara, Oobu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/797,080

(22) Filed: Mar. 11, 2004

(65) Prior Publication Data

US 2004/0178810 A1 Sep. 16, 2004

(30) Foreign Application Priority Data

Mar. 12, 2003 (JP) ........................................ 2003-066656

(51) Int. Cl.$^7$ ................................................ H03M 1/00
(52) U.S. Cl. ...................... 341/122; 331/185; 327/291
(58) Field of Search ........................ 341/122; 327/291; 331/175, 176, 185, 186

(56) References Cited

U.S. PATENT DOCUMENTS 6,593,823 B2 * 7/2003 Nakamiya et al. ............. 331/74

2003/0064694 A1 * 4/2003 Oka et al. ..................... 455/258

FOREIGN PATENT DOCUMENTS

| JP | 11-44585 | 2/1999 |
|----|----------|--------|
| JP | 11-64135 | 3/1999 |
| JP | 11-311559 | 11/1999 |
| JP | 2003-179492 | 6/2003 |

* cited by examiner

*Primary Examiner*—Howard L. Williams
(74) *Attorney, Agent, or Firm*—Posz Law Group, PLC

(57) ABSTRACT

The present invention relates to a sensor apparatus capable of outputting an accurate sensor signal irrespective of a variation of power supply voltage. In the sensor apparatus, when an A/D conversion circuit produces and outputs digital data, a switch circuit is placed into a first switching condition so that a constant voltage is applied from a constant-voltage circuit to an oscillation circuit, and a stabilized oscillation frequency is outputted from the oscillation circuit to the A/D conversion circuit. Thus, even if a power supply voltage varies, the A/D conversion circuit carries out sampling processing on analog data on the basis of the stabilized oscillation frequency from the oscillation circuit to produce and output the digital data.

6 Claims, 6 Drawing Sheets

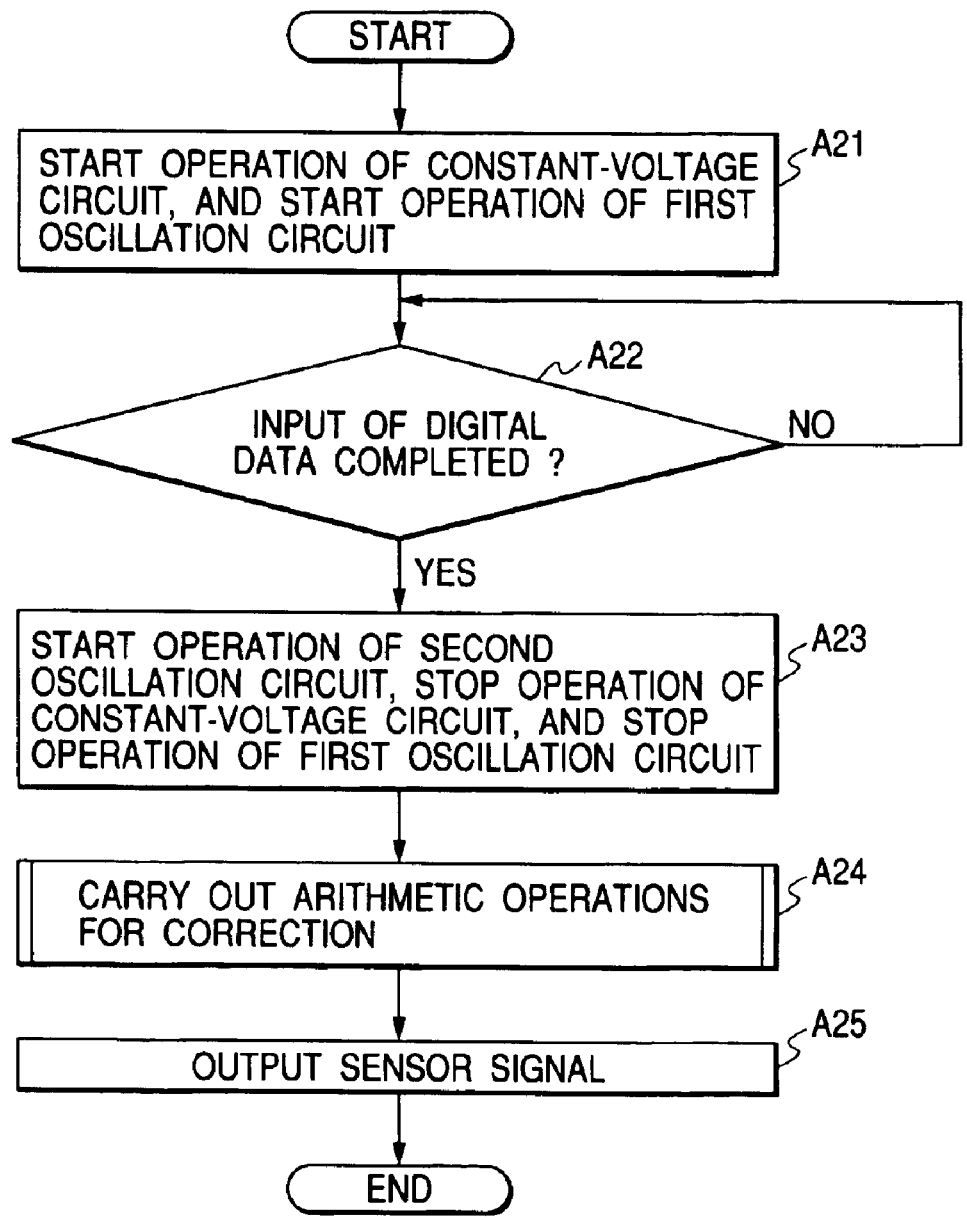

SENSOR APPARATUS

BACKGROUND OF THE INVENTION

1) Field of the Invention

The present invention relates to a sensor apparatus including an oscillation circuit for outputting an oscillation frequency to an A/D conversion circuit and the A/D conversion circuit for receiving the oscillation frequency from the oscillation circuit to conduct sampling processing on analog data on the basis of the inputted oscillation frequency for producing and outputting digital data.

2) Description of the Related Art

So far, there has been known a sensor apparatus (for example, see Japanese Patent Laid-Open Nos. HEI 11-44585 and HEI 11-64135) made up of an oscillation circuit for outputting an oscillation frequency to an A/D conversion circuit and the A/D conversion circuit for carrying out sampling processing on analog data on the basis of the inputted oscillation frequency from the oscillation circuit to produce and output digital data.

There is a problem which arises with the aforesaid Patent Documents, however, in that, since the oscillation circuit is made to output an oscillation frequency based on a power supply voltage directly applied from a power supply terminal, in response to a variation of the power supply voltage, the oscillation frequency to be outputted from the oscillation circuit varies to cause a variation of the sampling time in the A/D conversion circuit. Concretely, for example, when the power supply voltage varies in an increasing direction, the oscillation frequency to be outputted from the oscillation circuit varies in an increasing direction, while the sampling time in the A/D conversion circuit varies in a shortening direction.

As a result of this, reference information A, temperature information T or sensor information (pressure information) D, constituting the digital data to be produced in the A/D conversion circuit, decreases in proportion to the sampling time and this develops the occurrence of an error non-eliminable by the divisions such as T/A or D/A in the subsequent correction arithmetic operations in a digital circuit, so difficulty is encountered in outputting an accurate sensor signal.

SUMMARY OF THE INVENTION

The present invention has been developed in consideration of these situations, and it is therefore an object of the invention to provide a sensor apparatus capable of outputting an accurate sensor signal irrespective of a variation of the power supply voltage.

For this purpose, according to an aspect of the present invention, when at least an A/D conversion circuit produces and outputs digital data, a switch circuit sets a first switching condition and a constant-voltage circuit applies a constant voltage to an oscillation circuit so that a stabilized oscillation frequency is outputted from the oscillation circuit to the A/D conversion circuit. Thus, even if the power supply voltage varies, on the basis of the stabilized oscillation frequency inputted from the oscillation circuit, the A/D conversion circuit can carry out the sampling processing on analog data to produce digital data, thereby enabling the output of an accurate sensor signal.

In this sensor apparatus, after the output of the digital data from the A/D conversion circuit reaches completion, the switch circuit sets a second switching condition and the constant-voltage circuit stops its operation. Thus, the stop of the operation of the constant-voltage circuit can reduce the power dissipation in the apparatus as a whole. This is because, even if the oscillation frequency to be inputted from the oscillation circuit to a digital circuit varies with a variation of the power supply voltage, when the digital circuit conducts the arithmetic operations on digital data for correction, no influence of the variation of the oscillation frequency appears and, hence, there is no need to input the stabilized oscillation frequency positively from the oscillation circuit to the digital circuit.

In addition, in this sensor apparatus, a second constant-voltage circuit applies a constant voltage to the oscillation circuit at all times so that a stabilized oscillation frequency is always outputted from the oscillation circuit to the A/D conversion circuit. This also enables the A/D conversion circuit to conduct the sampling processing on the analog data on the basis of the stabilized oscillation frequency inputted from the oscillation circuit, which leads to outputting an accurate sensor signal.

Still additionally, in this sensor apparatus, the first constant-voltage circuit stops its operation after the output of the digital data from the A/D conversion circuit reaches completion. Accordingly, owing to the stop of the operation of the first constant-voltage circuit, as in the above-mentioned case, the power dissipation of the entire apparatus becomes reducible.

Moreover, in this sensor apparatus, a constant voltage is applied from the constant-voltage circuit to a first oscillation circuit at all times to output a stabilized oscillation frequency from the first oscillation circuit to the A/D conversion circuit at all times. Accordingly, the A/D conversion circuit can conduct the sampling processing on the analog data on the basis of the stabilized oscillation frequency inputted from the first oscillation circuit to produce and output digital data, which also leads to outputting an accurate sensor signal.

Still moreover, in this sensor apparatus, after the output of the digital data from the A/D conversion circuit reaches completion, the constant-voltage circuit stops its operation and the first oscillation circuit stops its operation. Accordingly, owing to the stop of the operation of the constant-voltage circuit and the stop of the operation of the first oscillation circuit, as in the above-mentioned case, the further reduction of power dissipation of the entire apparatus becomes achievable.

BRIEF DESCRIPTION OF THE DRAWINGS

Other objects and features of the present invention will become more readily apparent from the following detailed description of the preferred embodiments taken in conjunction with the accompanying drawings in which:

FIG. 6 is a flow chart showing processing to be implemented principally in a digital circuit according to the third embodiment.

DESCRIPTION OF THE PREFERRED EMBODIMENTS

Embodiments of the present invention will be described hereinbelow with reference to the drawings.

First Embodiment

Figure 1:
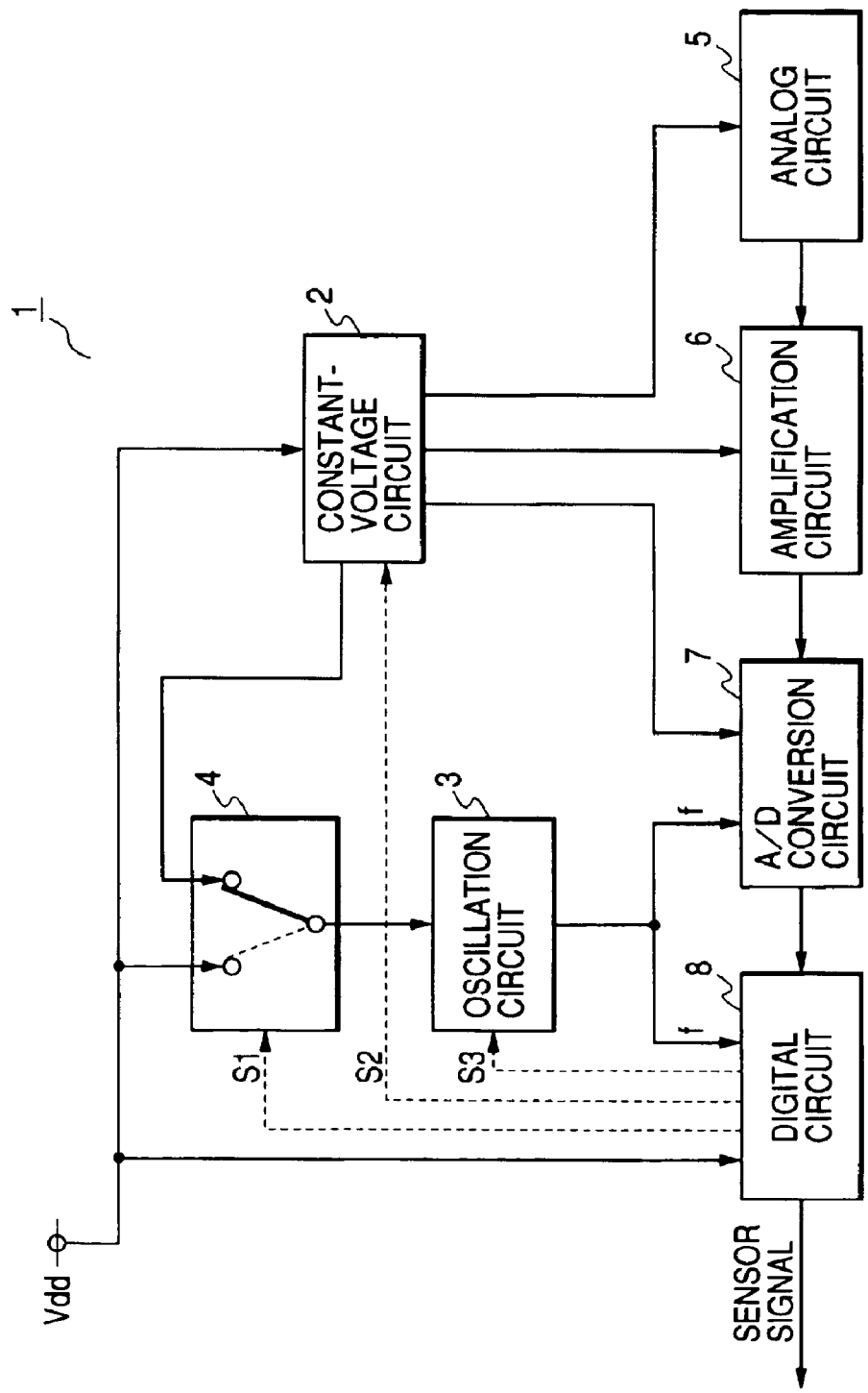
FIG. 1 is a functional block diagram showing a configuration of a sensor apparatus according to a first embodiment of the present invention.
Figure 2:
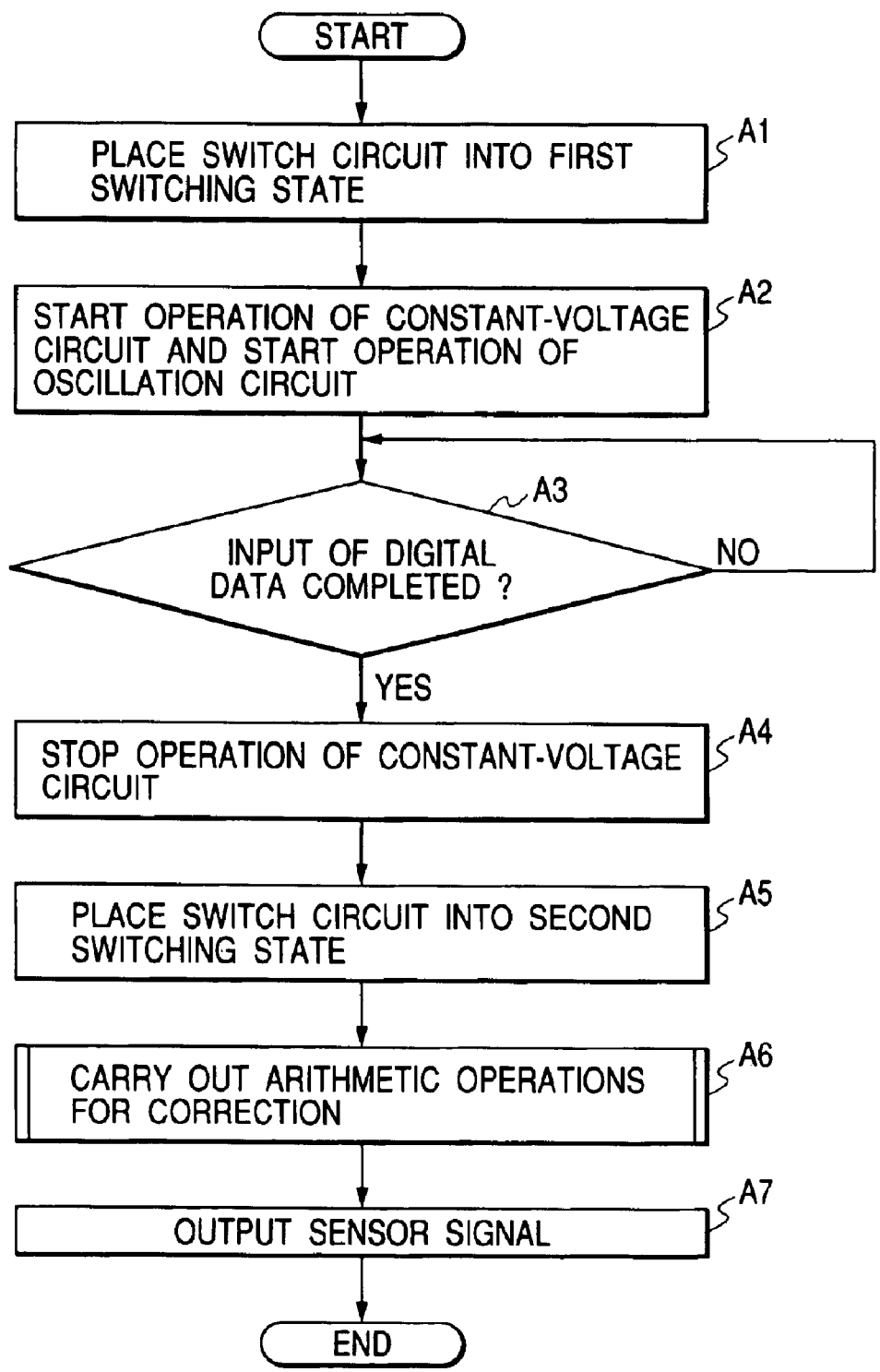
FIG. 2 is a flow chart showing processing to be implemented principally in a digital circuit according to the first embodiment.

Referring to FIGS. 1 and 2, a description will be given hereinbelow of a first embodiment in which the present invention is applied to a semiconductor pressure sensor for the pressure measurement.

FIG. 1 is a functional block diagram showing a configuration of a semiconductor pressure sensor according to this first embodiment.

The semiconductor pressure sensor, generally designated at reference numeral 1, is made up of a constant-voltage circuit 2, an oscillation circuit 3, a switch circuit 4, an analog circuit 5, an amplification circuit 6, an A/D conversion circuit 7 and a digital circuit 8. The constant-voltage circuit 2 is for, when a power supply voltage is applied thereto through a power supply terminal (Vdd), stabilizing the applied power supply voltage to produce a constant voltage. That is, even in a case in which the power supply voltage from the power supply terminal varies in a range of several % to several tens %, the constant-voltage circuit 2 is capable of producing a constant voltage unsusceptible by the variation of the power supply voltage.

The switch circuit 4 is made to set a first switching condition (state indicated by a solid line in the illustration) and a second switching condition (state indicated by a broken line therein), and when it sets the first switching condition, the constant voltage from the constant-voltage circuit 2 comes to the oscillation circuit 3, and when it sets the second switching condition, a direct power supply voltage from the power supply terminal acts on the oscillation circuit 3.

The oscillation circuit 3 outputs an oscillation frequency f to the A/D conversion circuit 7 and the digital circuit 8 with the constant voltage being applied from the constant-voltage circuit 2 through the switch circuit 4 thereto in response to the first switching condition in the switch circuit 4 or with the power supply voltage being applied from the power supply terminal through the switch circuit 4 thereto in conjunction with the second switching condition in the switch circuit 4.

The analog circuit 5 operates in a state where the constant voltage from the constant-voltage circuit 2 is used as a drive voltage therefor and, when its sensing unit detects a pressure, outputs analog data corresponding to the detected pressure value to the amplification circuit 6. The amplification circuit 6 operates through the use of the constant voltage from the constant-voltage circuit 2 serving as a drive voltage therefor and, upon receipt of the analog data from the analog circuit 5, amplifies the inputted analog data according to a predetermined amplification factor and outputs it to the A/D conversion circuit 7.

The A/D conversion circuit 7 works with the constant voltage from the constant-voltage circuit 2 serving as a drive voltage therefor and, upon receipt of the amplified analog data from the amplification circuit 6, carries out the sampling processing on the analog data on the basis of the oscillation frequency f inputted from the oscillation circuit 3 to produce the corresponding digital data, with the produced digital data being outputted therefrom to the digital circuit 8.

The digital circuit 8 works in response to the direct power supply voltage from the power supply terminal serving as a drive voltage therefor and, upon receipt of the digital data from the A/D conversion circuit 7, carries out the correction arithmetic operations on the reference information A, the temperature information T and the sensor information (pressure information) D, forming the digital information, according to predetermined computing equations on the basis of the oscillation frequency f inputted from the oscillation circuit 3, and outputs the arithmetic results in the form of a sensor signal. Moreover, in the above-mentioned arrangement, the digital circuit 8 outputs a control signal S1 to the switch circuit 4 to set the switching condition in the switch circuit 4, and outputs a control signal S2 to the constant-voltage circuit 2 to control the operation of the constant-voltage 2, and further outputs a control signal S3 to the oscillation circuit 3 to control the operation of the oscillation circuit 3.

Secondly, an operation of the above-described arrangement will be described hereinbelow with reference to FIG. 2. FIG. 2 is a flow chart showing the processing to be conducted in the digital circuit 8.

The digital circuit 8 outputs the control signal S1 to the switch circuit 4 to place the switch circuit 4 into the first switching condition (step A1), outputs the control signal S2 to the constant-voltage circuit 2 to make the constant-voltage circuit 2 start its operation, and further outputs the control signal S3 to the oscillation circuit 3 to start the operation of the oscillation circuit 3 (step A2). Thus, a constant voltage from the constant-voltage circuit 2 is applied to each of the analog circuit 5, the amplification circuit 6 and the A/D conversion circuit 7, which in turn starts its operation.

At this time, the oscillation circuit 3 receives the constant voltage from the constant-voltage circuit 2 since the switch circuit 4 is set in the first switching condition, thereby outputting a stabilized oscillation frequency f to the A/D conversion circuit 7, while, upon receipt of analog data from the amplification circuit 6, the A/D conversion circuit 7 carries out the sampling processing on the analog data on the basis of the stabilized oscillation frequency f to produce and output digital data.

Following this, the digital circuit 8 makes a decision as to whether or not the input of the digital data from the A/D conversion circuit 7 reaches completion (step A3), and whether or not the A/D conversion circuit 7 has completely conducted the output of the digital data. When detecting the completion of the input of the digital data from the A/D conversion circuit 7 ("YES" in step A3) and detecting the completion of the output of the digital data from the A/D conversion circuit 7, the digital circuit 8 outputs the control signal S2 to the constant-voltage circuit 2 to stop the operation of the constant-voltage circuit 2 (step A4) and outputs the control signal S1 to the switch circuit 4 to place the switch circuit 4 into the second switching condition (step A5). Moreover, the digital circuit 8 conducts the correction arithmetic operations on the digital data inputted from the A/D conversion circuit 7 (step A6) and outputs the arithmetic result as a sensor signal (step A7).

In this case, since the switch circuit 4 is placed into the second switching condition, the power supply voltage is directly applied through the power supply terminal to the oscillation circuit 3, which in turn outputs an oscillation frequency f based on the applied power supply voltage to the digital circuit 8. Accordingly, upon receipt of the digital data from the A/D conversion circuit 7, the digital circuit 8 performs the correction arithmetic operations on the digital data on the basis of the oscillation frequency f based on the power supply voltage. However, even if the oscillation frequency f to be inputted from the oscillation circuit 3 to the digital circuit 8 varies with a variation of the power supply voltage, no influence of the variation of that oscillation frequency f appears and, hence, no trouble takes place.

As described above, according to the first embodiment, in the semiconductor pressure sensor apparatus 1, when the A/D conversion circuit 7 produces and outputs digital data, the switch circuit 4 is placed into the first switching condition so that a constant voltage is applied from the constant-voltage circuit 2 to the oscillation circuit 3, thus enabling the oscillation circuit 3 to output a stabilized oscillation frequency f to the A/D conversion circuit 7. Therefore, even if the power supply voltage varies, the A/D conversion circuit 7 can produce and output digital signal through the sampling processing on analog data based on the stabilized oscillation frequency f inputted from the oscillation circuit 3, thereby outputting an accurate sensor signal.

In this case, after the completion of the output of the digital data from the A/D conversion circuit 7, the switch 4 is placed into the second switching condition and the constant-voltage circuit 2 is placed into an operation stopped condition, which leads to the reduction of the power dissipation in the apparatus as a whole.

Second Embodiment

Furthermore, referring to FIGS. 3 and 4, a description will be given hereinbelow of a second embodiment of the present invention. The same parts as those in the above-described first embodiment are omitted from the description, and the description is focused on the different portions therefrom. Although in the above-described embodiment the switch circuit 4 is provided to apply a constant voltage from the constant-voltage circuit 2 to the oscillation circuit 3 when the A/D conversion circuit 7 is in operation, according to the second embodiment two constant-voltage circuits are provided so that a constant voltage is applied from one constant-voltage circuit to an oscillation circuit at all times.

That is, a semiconductor pressure sensor 11 is made up of a first constant-voltage circuit 12, a second constant-voltage circuit 13, an oscillation circuit 14, an analog circuit 5, an amplification circuit 6, an A/D conversion circuit 7 and a digital circuit 15. In this configuration, the second constant-voltage circuit 13, in response to a power supply voltage being applied thereto through a power supply terminal, stabilizes the applied power supply voltage to produce a constant voltage, and the oscillation circuit 14 is exposed to the constant voltage from the second constant-voltage circuit 13 at all times, thus always outputting a stabilized oscillation frequency f to the A/D conversion circuit 7 and the digital circuit 15.

Secondly, referring to FIG. 4, a description will be given hereinbelow of an operation of the above-mentioned apparatus configuration.

The digital circuit 15 outputs a control signal S4 to the first constant-voltage circuit 12 to make the first constant-voltage circuit 12 start its operation, and outputs a control signal S5 to the second constant-voltage circuit 13 to make the second constant-voltage circuit 13 start its operation, and further outputs a control signal S6 to the oscillation circuit 14 to make the oscillation circuit 14 start its operation (step A11). Accordingly, a constant voltage is applied from the first constant-voltage circuit 12 to each of the analog circuit 5, the amplification circuit 6 and the A/D conversion circuit 7, which in turn starts its operation.

At this time, since the constant voltage is applied from the second constant-voltage circuit 13, the oscillation circuit 14 outputs a stabilized oscillation frequency f to the A/D conversion circuit 7, and upon receipt of analog data from the amplification circuit 6, the A/D conversion circuit 7 produces and outputs digital data through the sampling processing on the analog data on the basis of the stabilized oscillation frequency f.

Thereafter, when detecting the fact that the input of the digital data from the A/D conversion circuit 7 reaches completion ("YES" in step A12) and detecting the fact that the output of the digital data from the A/D conversion circuit 7 reaches completion, the digital circuit 15 outputs the control signal S4 to the first constant-voltage circuit 12 to stop the operation of the first constant-voltage circuit 12 (step A13). Moreover, the digital circuit 15 carries out the correction arithmetic operations on the digital data inputted from the A/D conversion circuit 7 (step A14) and outputs an arithmetic result as a sensor signal (step A15).

As described above, according to the second embodiment, in the semiconductor pressure sensor apparatus 11, a constant voltage is applied from the second constant-voltage circuit 12 to the oscillation circuit 14 at all times so that a stabilized oscillation frequency f is always outputted from the oscillation circuit 14 to the A/D conversion circuit 7, and even if the power supply voltage varies, the A/D conversion circuit 7 can produce and output digital signal through the sampling processing on analog data based on the stabilized oscillation frequency f inputted from the oscillation circuit 14, thereby outputting an accurate sensor signal as well as the above-described first embodiment.

Also in this case, after the completion of the output of the digital data from the A/D conversion circuit 7, the first constant-voltage circuit 12 is placed into an operation stopped condition, which leads to the reduction of the power dissipation in the apparatus as a whole as well as the above-described first embodiment, for that the first constant-voltage circuit 12 is placed into an operation stopped condition.

Third Embodiment

Figure 3:
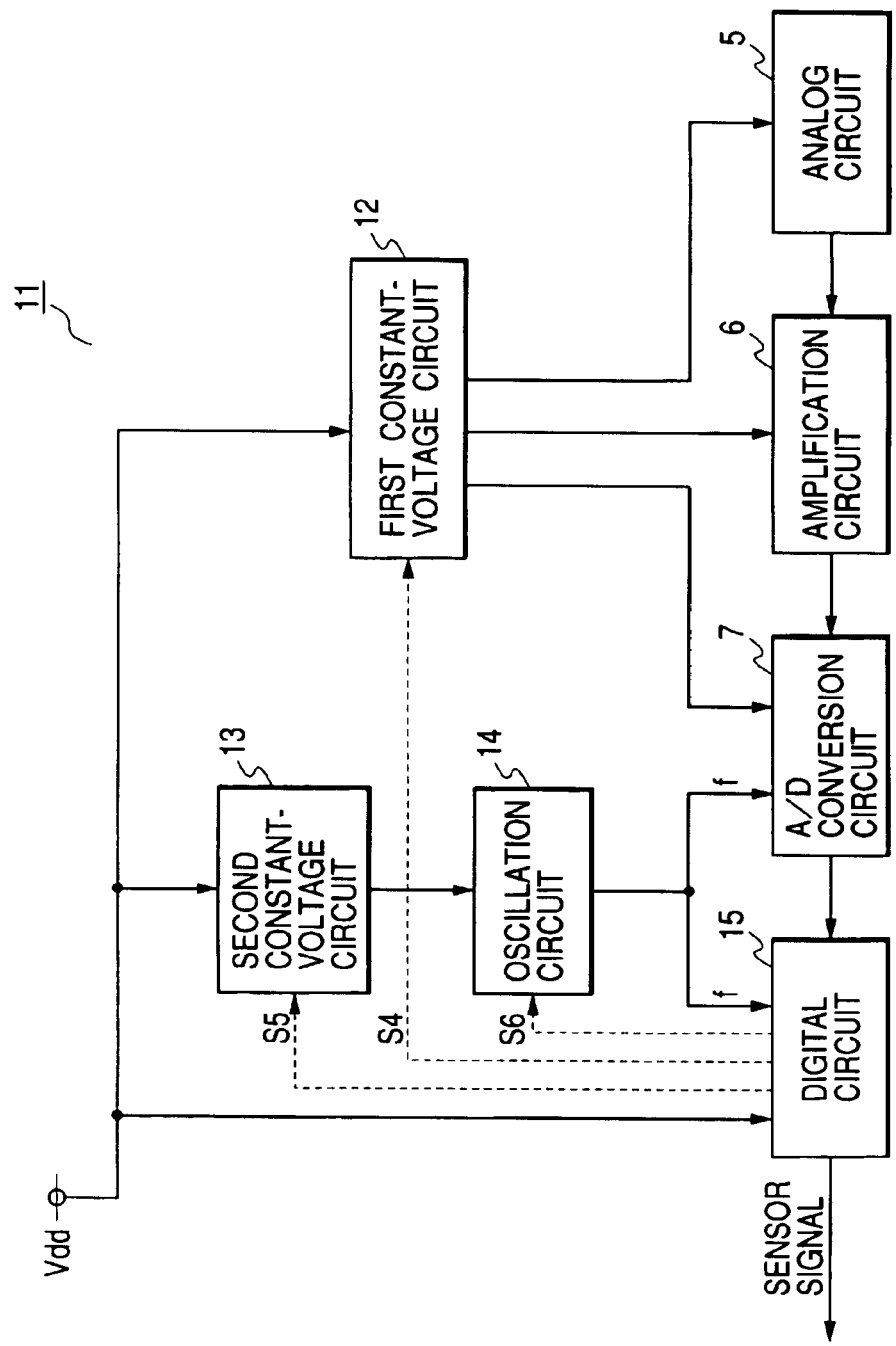
FIG. 3 is a functional block diagram showing a configuration of a sensor apparatus according to a second embodiment of the present invention.
Figure 4:
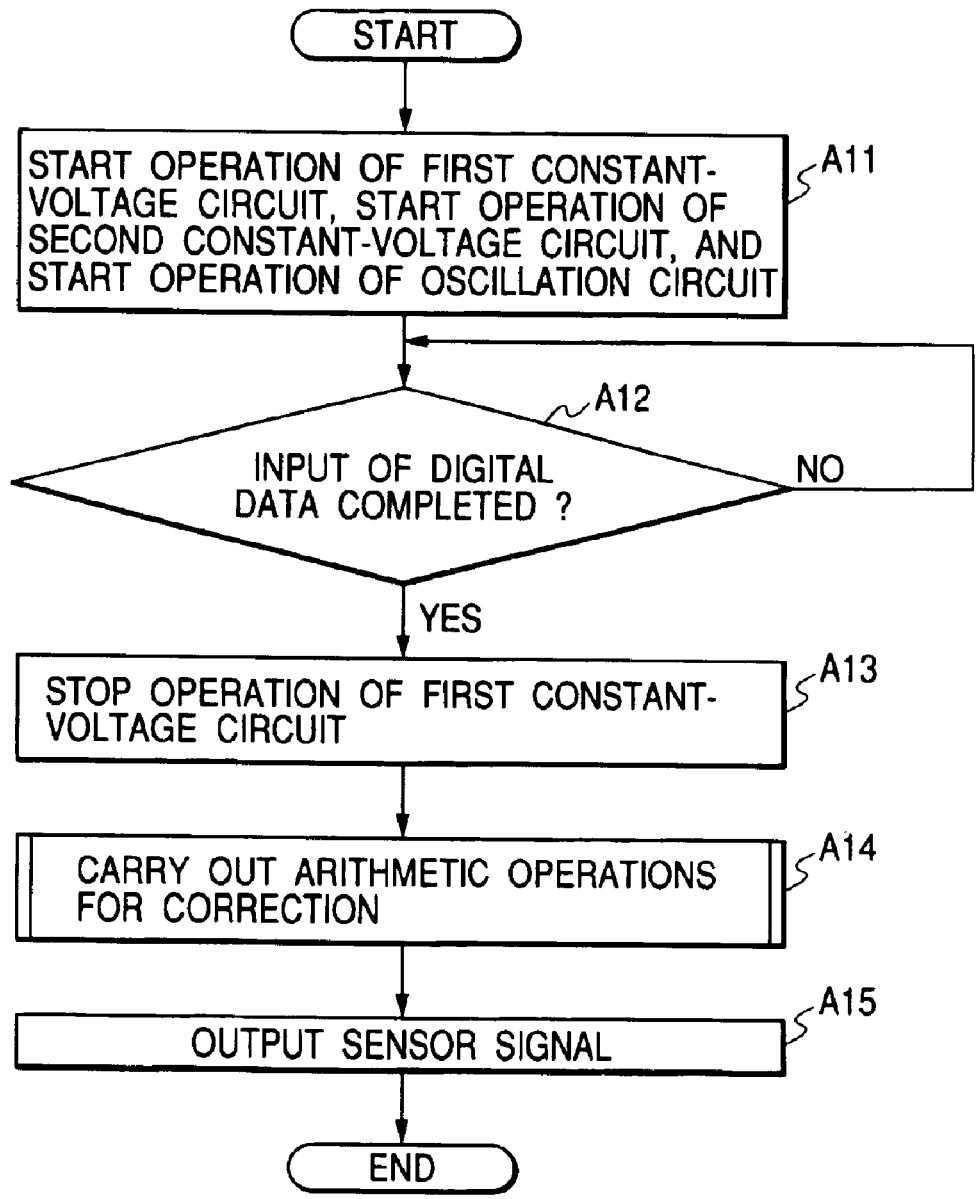
FIG. 4 is a flow chart showing processing to be implemented principally in a digital circuit according to the second embodiment.
Figure 5:
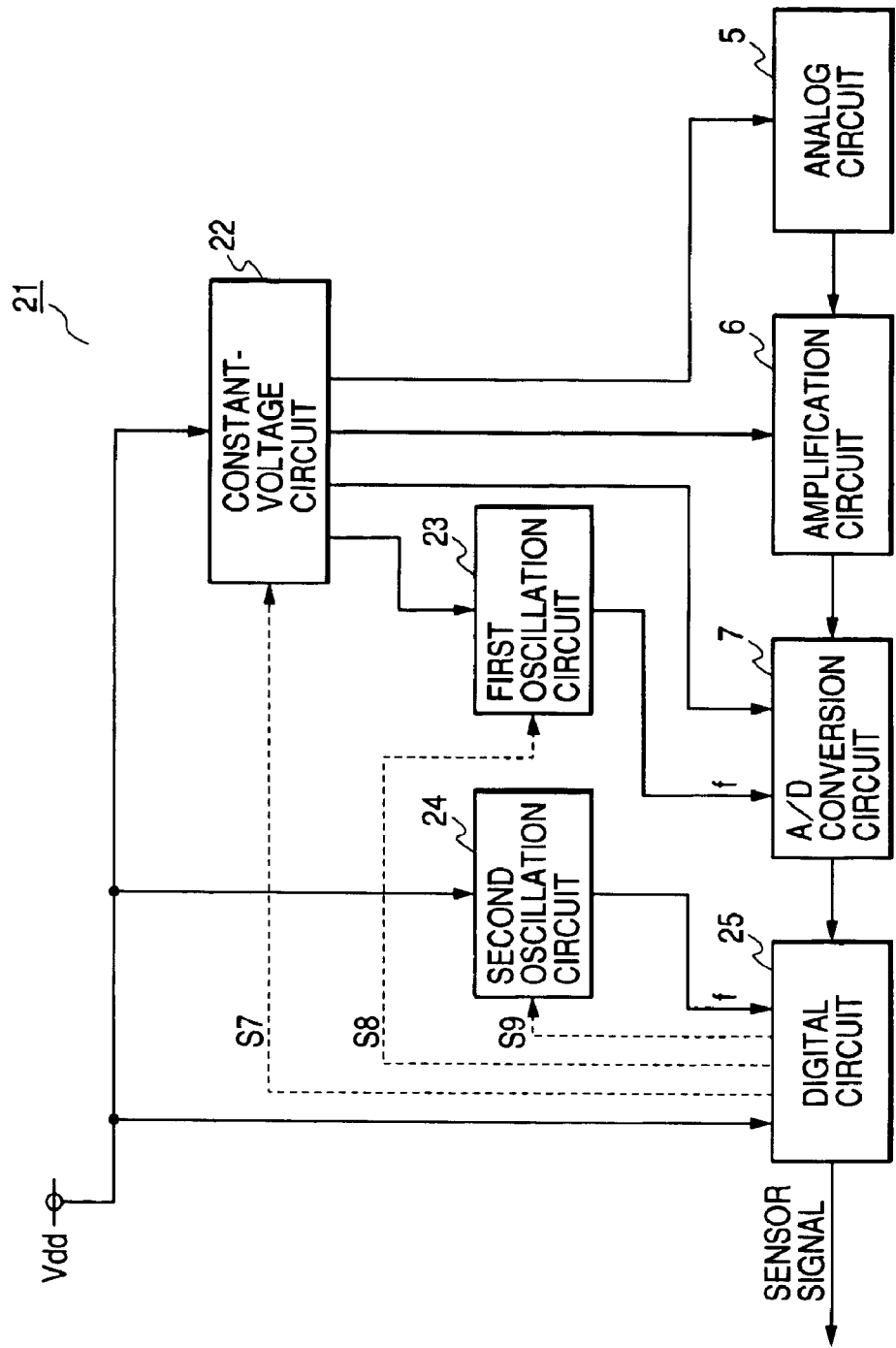
FIG. 5 is a functional block diagram showing a configuration of a sensor apparatus according to a third embodiment of the present invention.

Referring to FIGS. 3 and 4, a description will be given hereinbelow of a third embodiment of the present invention. The description of the same parts as those in the above-described first embodiment are omitted for brevity, and the description here is focused on the different portions therefrom. According to the third embodiment, two oscillation circuits are provided so that a constant voltage is applied from a constant-voltage circuit to one oscillation circuit at all times.

That is, a semiconductor pressure sensor apparatus 21 is made up of a constant-voltage circuit 22, a first oscillation circuit 23, a second oscillation circuit 24, an analog circuit 5, an amplification circuit 6, an A/D conversion circuit 7 and a digital circuit 25. In this configuration, the constant-voltage circuit 22, in response to a power supply voltage being applied thereto through a power supply terminal, stabilizes the applied power supply voltage to produce a constant voltage, and the first oscillation circuit 23 is exposed to the constant voltage from the constant-voltage circuit 22 at all times, thus always outputting a stabilized oscillation frequency f to the A/D conversion circuit 7.

Secondly, referring to FIG. 6, a description will be given hereinbelow of an operation of the above-mentioned apparatus configuration.

The digital circuit 25 outputs a control signal S7 to the constant-voltage circuit 22 to make the constant-voltage circuit 22 start its operation, and outputs a control signal S8 to the first oscillation circuit 23 to make the first oscillation circuit 23 start its operation (step A21). Accordingly, a constant voltage is applied from the constant-voltage circuit 22 to each of the analog circuit 5, the amplification circuit 6 and the A/D conversion circuit 7, which in turn starts its operation.

At this time, since the constant voltage is applied from the constant-voltage circuit 22, the first oscillation circuit 23 outputs a stabilized oscillation frequency f to, the A/D conversion circuit 7, and upon receipt of analog data from the amplification circuit 6, the A/D conversion circuit 7 produces and outputs digital data through the sampling processing on the analog data on the basis of the stabilized oscillation frequency f.

Thereafter, when detecting the fact that the input of the digital data from the A/D conversion circuit 7 reaches completion ("YES" in step A22) and detecting the fact that the A/D conversion circuit 7 has completely outputted the digital data, the digital circuit 25 outputs a control signal S9 to the second oscillation circuit 24 to start the operation of the second oscillation circuit 24, and outputs a control signal S7 to the constant-voltage circuit 22 to stop the operation of the constant-voltage circuit 22, and further outputs a control signal S8 to the first oscillation circuit 23 to stop the operation of the first oscillation circuit 23 (step A23). Moreover, the digital circuit 25 carries out the correction arithmetic operations on the digital data inputted from the A/D conversion circuit 7 (step A24) and outputs an arithmetic result as a sensor signal (step A25).

As described above, according to the third embodiment, in the semiconductor pressure sensor apparatus 21, a constant voltage is applied from the constant-voltage circuit 22 to the first oscillation circuit 23 at all times so that a stabilized oscillation frequency f is always outputted from the first oscillation circuit 23 to the A/D conversion circuit 7, and even if the power supply voltage varies, the A/D conversion circuit 7 can produce and output digital signal through the sampling processing on analog data based on the stabilized oscillation frequency f inputted from the first oscillation circuit 23, thereby outputting an accurate sensor signal as well as the above-described first embodiment.

In this case, after the completion of the output of the digital data from the A/D conversion circuit 7, the constant-voltage circuit 22 is placed into an operation stopped condition and the first oscillation circuit 23 is placed into an operation stopped condition, which leads to the reduction of the power dissipation in the apparatus as a whole as well as the above-described first embodiment, for that the constant-voltage circuit 22 is placed into the operation stopped condition and the first oscillation circuit 23 is placed into the operation stopped condition.

Other Embodiments

The present invention is not limited to the above-described embodiments, but the following modifications or extensions are also achievable.

The present invention is not limited to a semiconductor pressure sensor, but it is also applicable to sensor apparatus designed to measure other physical quantities such as acceleration, magnetic flux and humidity.

The present invention is not limited to suppressing the variation of an oscillation frequency stemming from a variation of a power supply voltage, but it is also applicable to suppressing the variation of the oscillation frequency due to a variation of temperature by utilizing the fact that a constant-voltage circuit can absorb, in addition to a variation of the power supply voltage, a variation of temperature.

What is claimed is:

1. A sensor apparatus comprising:
   a constant-voltage circuit for stabilizing a power supply voltage applied directly thereto through a power supply terminal to produce a constant voltage;
   an oscillation circuit for outputting an oscillation frequency on the basis of the applied voltage;
   a switch circuit for setting a first switching condition for applying said constant voltage from said constant-voltage circuit to said oscillation circuit and a second switching condition for applying said power supply voltage from said power supply terminal directly to said oscillation circuit; and
   an A/D conversion circuit made to operate in a state where said constant voltage from said constant-voltage circuit is used as a drive voltage therefor, and made to carry out sampling processing on analog data on the basis of said oscillation frequency inputted from said oscillation circuit to produce and output digital data,
   wherein said switch circuit is placed into said first switching condition when at least said A/D conversion circuit produces and outputs said digital data.

2. The apparatus according to according to claim 1, further comprising a digital circuit made to operate in a state where said power supply voltage applied directly through said power supply terminal is used as a drive voltage therefor, and made to carry out correction arithmetic operations on said digital data inputted from said A/D conversion circuit on the basis of said oscillation frequency inputted from said oscillation circuit, so that, after the output of said digital data from said A/D conversion circuit reaches completion, said switch circuit is placed into said second switching condition and said constant-voltage circuit is placed into an operation stopped condition.

3. A sensor apparatus comprising:
   a first constant-voltage circuit for stabilizing a power supply voltage applied directly thereto through a power supply terminal to produce a constant voltage;
   a second constant-voltage circuit for stabilizing said power supply voltage applied directly thereto through said power supply terminal to produce a constant voltage;
   an oscillation circuit for outputting an oscillation frequency on the basis of said constant voltage applied from said second constant-voltage circuit; and
   an A/D conversion circuit made to operate in a state where said constant voltage from said first constant-voltage circuit is used as a drive voltage therefor, and made to carry out sampling processing on analog data on the basis of said oscillation frequency inputted from said oscillation circuit to produce and output digital data.

4. The apparatus according to according to claim 3, further comprising a digital circuit made to operate in a state where said power supply voltage applied directly through said power supply terminal is used as a drive voltage therefor, and made to carry out correction arithmetic operations on said digital data inputted from said A/D conversion circuit on the basis of said oscillation frequency inputted from said oscillation circuit, so that, after the output of said digital data from said A/D conversion circuit reaches completion, said first constant-voltage circuit is placed into an operation stopped condition.

5. A sensor apparatus comprising:
   a constant-voltage circuit for stabilizing a power supply voltage applied directly thereto through a power supply terminal to produce a constant voltage;
   a first oscillation circuit for outputting an oscillation frequency on the basis of said constant voltage applied from said constant-voltage circuit; and
   an A/D conversion circuit made to operate in a state where said constant voltage from said constant-voltage circuit is used as a drive voltage therefor, and made to carry out sampling processing on analog data on the basis of said oscillation frequency inputted from said first oscillation circuit to produce and output digital data.

6. The apparatus according to according to claim 5, further comprising:

a second oscillation circuit for outputting an oscillation frequency on the basis of said power supply voltage applied directly through said power supply terminal; and a digital circuit made to operate in a state where said power supply voltage applied directly through said power supply terminal is used as a drive voltage therefor, and made to carry out correction arithmetic operations on said digital data inputted from said A/D conversion circuit on the basis of said oscillation frequency inputted from said second oscillation circuit, so that, after the output of said digital data from said A/D conversion circuit reaches completion, said constant-voltage circuit is placed into an operation stopped condition and said first oscillation circuit is placed into an operation stopped condition.

* * * * *